(12) United States Patent
Bianco

(10) Patent No.: US 8,297,512 B2
(45) Date of Patent: Oct. 30, 2012

(54) INDUSTRIAL SCANNER

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 307 days.

(21) Appl. No.: 12/658,658

(22) Filed: Feb. 12, 2010

(65) Prior Publication Data

US 2010/0200659 A1    Aug. 12, 2010

Related U.S. Application Data

(60) Provisional application No. 61/207,410, filed on Feb. 12, 2009.

(51) Int. Cl.
*G06K 7/10*    (2006.01)

(52) U.S. Cl. .............. 235/470; 235/472.01; 235/462.44

(58) Field of Classification Search .......... 235/462.44, 235/462.45, 462.46, 472.01, 472.02, 472.03, 235/473.03, 470
See application file for complete search history.

(56) References Cited

U.S. PATENT DOCUMENTS

| | | | | |
|---|---|---|---|---|
| 5,140,144 A | * | 8/1992 | Shepard et al. | 235/472.01 |
| 5,429,477 A | * | 7/1995 | Sikorski et al. | 415/119 |
| 5,861,817 A | * | 1/1999 | Palmer et al. | 340/5.91 |

* cited by examiner

*Primary Examiner* — Karl D Frech
(74) *Attorney, Agent, or Firm* — Alix, Yale & Ristas, LLP

(57) ABSTRACT

A scanner module is constructed for use in a high impact, high usage environment. The industrial scanner employs a substantially box-like enclosure with an integral handle extending from a bottom portion forming an elongated slot. A scanner window is located in one panel of the enclosure and cushioning materials disposed in the enclosure for providing heavy-duty impact resistance. An externally accessible keyboard display window and a display assembly is employed at a frontal portion of the enclosure.

11 Claims, 2 Drawing Sheets

INDUSTRIAL SCANNER

CROSS-REFERENCE TO RELATED APPLICATION

This application claims the priority of U.S. Provisional Patent Application No. 61/207,410 filed Feb. 12, 2009, the entirety of which is incorporated herein by reference.

BACKGROUND

This disclosure relates generally to bar code scanners. More particularly, this disclosure relates to handheld scanners which are used in severe environments and are subject to intense usage.

The use of scanners to read bar codes, identification tags and other types of information is well established. Such scanners generally provide digitized signals which are used for various processing tasks and are highly useful in commercial transactions which require voluminous data and high speed processing.

The usefulness of such scanners for various transactions has resulted in increased usage and popularity. Because scanners for some applications may be subject to intense usage, the useful lifetime and the reliability of the scanners can be severely impacted. The housings for the electronics of the scanners are typically not constructed for the high-impact, high usage environment, nor are such scanner housings specially configured for versatile manual usage for a prolonged period of time.

SUMMARY

Briefly stated an industrial scanner adapted for heavy duty usage comprises a substantially box-like enclosure. The enclosure is manufactured for heavy duty impact-resistant material. A panel of the enclosure has a cable opening. An integral handle extends from another panel and forms an elongated slot. The handle is configured to facilitate manual grasping by extending portions of the fingers through the slot. A scanner window is located in one panel of the enclosure. Cushioning material is disposed in the enclosure.

An electronic scanner module is received in the enclosure and engages against the cushioning material so that the scanner module is secured in a stable impact-resistant relationship with the enclosure. The electronic scanner module comprises an externally accessible keyboard display window and interior electronic display assembly for producing a visible display at the display window. An optical scanner package optically communicates through the scanner window. The frontal keyboard and display window and the scanner window are disposed at opposite exterior sides of the enclosure.

A cable extends from a panel opening and communicates with the scanner module. In a preferred form, the cushioning material comprises foam panels disposed on a panel and side interior surfaces of the enclosure. A reinforcement shroud circumscribes the enclosure adjacent to the front portion. The scanner package is mounted to a bracket which is secured to form a shock absorbing mount for the scanner package.

DETAILED DESCRIPTION OF THE PREFERRED EMBODIMENT

Figure 1:
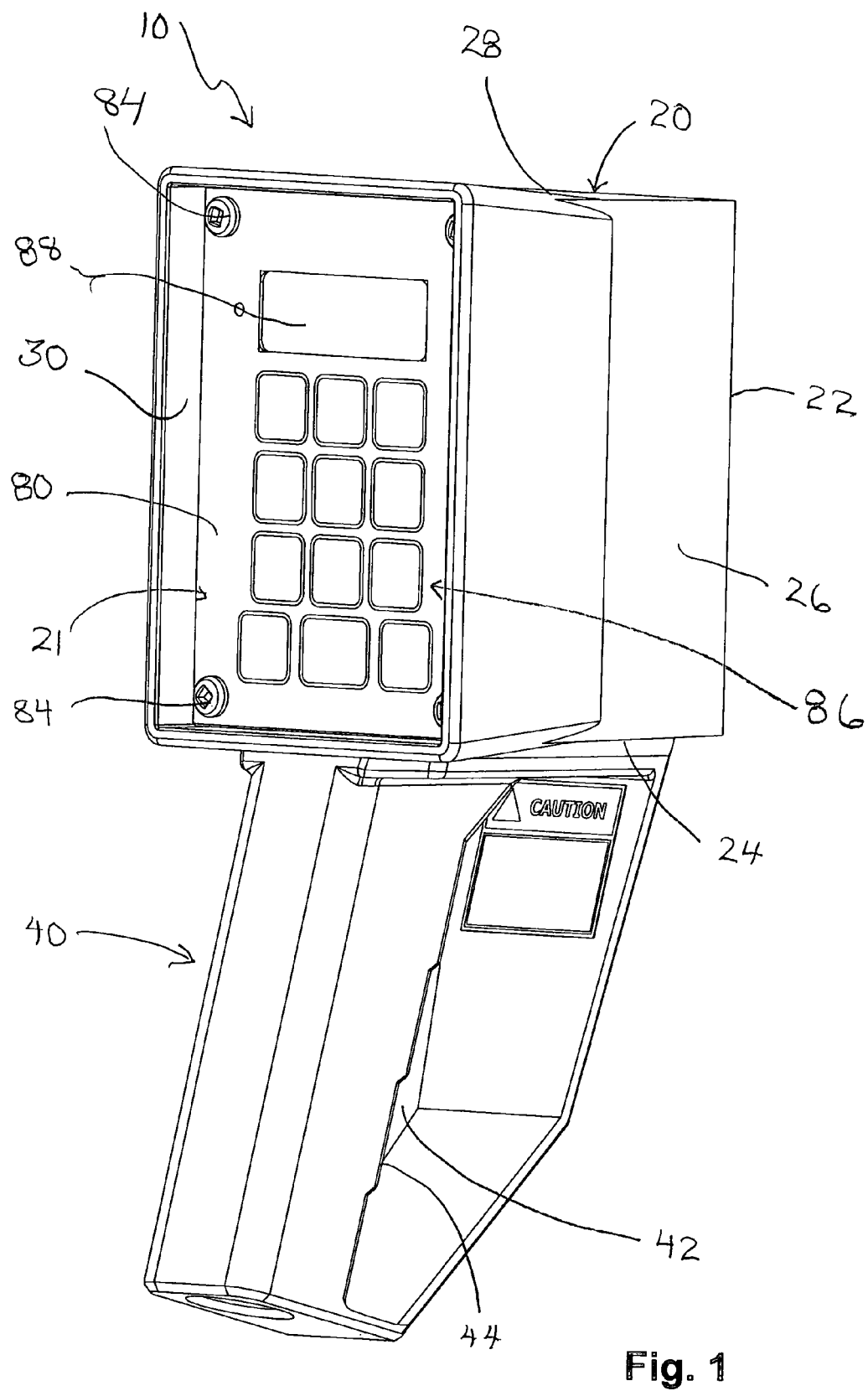
FIG. 1 is a perspective view of an industrial scanner for heavy-duty usage.
Figure 2:
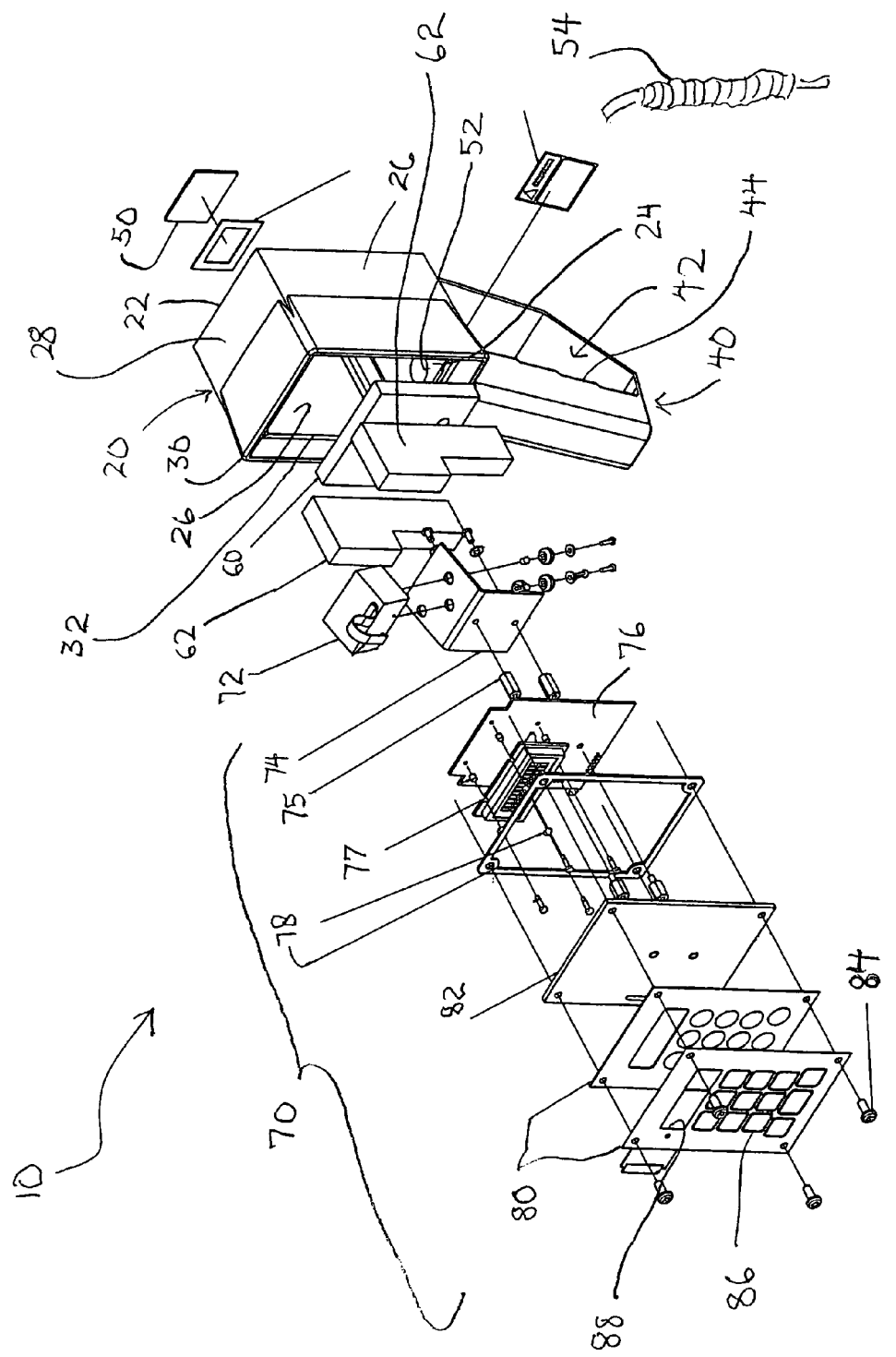
FIG. 2 is an exploded view of the industrial scanner of FIG. 1.

With reference to the drawings wherein like numerals represent like parts throughout the Figures, a handheld industrial bar code scanner which is especially adapted for heavy-duty usage is generally designated by the numeral 10. The scanner 10 is constructed to facilitate manual usage under intense conditions and is highly impact-resistant to provide efficient and reliable usage. The scanner 10 has an efficient ergonomic construction which is suitable for numerous applications such as, for example, checking in vehicles at an auto rental return facility.

An enclosure 20 has a box-like construction with a closed front 21, a rear panel 22, a bottom panel 24, opposed side panels 26 and a top panel 28. A reinforced frame-like shroud 30 circumscribes the frontal portions of the top, bottom and side panels. The enclosure 20 is formed of rugged impact-resistant plastic and includes an interior molded mounting rim 32. the rim 32 comprises four strips which form an engagement and securing surface for the various components.

A handle 40 integrally extends from the bottom panel and includes an elongated slot 42 and adjacent a finger contoured grip surface 44 so that the handle can be easily gripped and operated for usage and be advantageously positioned for the proper scanning orientation. The handle 40 preferably extends at a slight angle to the bottom panel to provide an ergonomically conducive orientation for the interactive optical communications as hereinafter described.

The rear panel 22 has a scanner window 50 through which the optical beam is transmitted for reading the bar codes or other identification information. The bottom panel includes an opening 52 for receiving the cable 54 (schematically illustrated) which provides power/signal communication to a remote terminal unit (not illustrated).

A foam panel 60 is positioned against the bottom panel 24 at the interior, and opposed panels 62 are positioned against the interior side panels 26 of the enclosure. The panels receive the electronic scanner module 70 in a close fitting impact-resistant relationship so that the electronic scanner module remains relatively stable, even when the exterior enclosure is subject to a high impact or intense stresses.

A five-volt IR laser scanner package 72 is mounted to an L-shaped bracket 74 and optically aligned with the scanner window 50. The bracket is mounted in standoff fashion via foam standoffs 75 to a support plate assembly 76. A display assembly 77 is mounted to the opposite (frontal) side of the plate assembly 76. The support assembly 76 is in turn mounted to a mounting plate 78 which is secured to the interior mounting rim 32. The foregoing mounting relationship provides a shock resistant mount for the laser scanner package 72.

A membrane/keyboard overlay unit 80 for the scanner module is mounted over plates 82 and 78 and secured via screws 84 with the assembly 76 to the mounting rim 32 to secure the assembled scanner module 70 in a fixed, stable, rigid position within the enclosure so that the keyboard 86 is exteriorly accessible at the front. The unit 80 forms a window 88 in alignment with the display assembly 77 for producing a visual display above the keyboard 86.

In one form, the cable 54 connects with the scanner module and is configured as a coiled 25 foot heavy-duty cable which has seven conductors.

It will be appreciated that the foregoing construction provides a versatile scanner which can be easily grasped by the user and aimed to read a bar code or other identification tag, and various inputs can be relatively easily entered on the keyboard 86 with the other hand while visually observing the information on the display window 88.

While preferred embodiments of the foregoing scanner module have been set forth for purposes of description, the foregoing description should not be deemed a limitation of the invention herein. Accordingly, various modifications, adaptations and alternatives may occur to one skilled in the art without departing from the spirit and the scope of the present invention.

The invention claimed is:

1. A scanner comprising:
   a substantially box-like enclosure comprising a first panel and a second panel, said enclosure being manufactured of heavy-duty impact resistant material and said second panel defining a cable opening;
   an integral handle extending from said second panel and forming an elongated slot, said handle being configured to facilitate manual grasping thereof by extending portions of said fingers through said elongated slot;
   a scanner window located in said first panel of said enclosure;
   cushioning material disposed in said enclosure and comprising foam panels disposed on said second panel and side interior surfaces of said enclosure; and
   an electronic scanner module received in said enclosure and engageable against said cushioning material wherein said scanner module is secured in a stable, impact resistant relationship with said enclosure, said electronic scanner module comprising an externally accessible keyboard and display window, an interior electronic display assembly for producing a display at the display window and a scanner package for optically communicating through said scanner window, and wherein said keyboard and display window, and said scanner window are disposed at opposite exterior sides of said enclosure.

2. The scanner of claim 1 further comprising a cable extending from the second panel of said enclosure and communicating with said electronic scanner module.

3. The scanner of claim 1 further comprising a reinforcement shroud circumscribing said enclosure adjacent the frontal portion thereof.

4. The scanner of claim 1 wherein said scanner package is mounted to a bracket which is secured to form a shock absorbing mount for the scanner package.

5. A scanner comprising:
   a substantially box-like enclosure comprising a rear panel and a bottom panel, said enclosure being manufactured of heavy-duty impact resistant material and having an integral reinforcement shroud circumscribing said enclosure adjacent a frontal portion of said enclosure;
   an integral handle extending from said bottom panel and forming an elongated slot, said handle being configured to facilitate manual grasping thereof by extending portions of said fingers through said elongated slot;
   a scanner window located in said rear panel of said enclosure;
   cushioning material disposed in said enclosure; and
   an electronic scanner module received in said enclosure and engageable against said cushioning material wherein said scanner module is secured in a stable, impact resistant relationship with said enclosure, said electronic scanner module comprising an externally accessible keyboard and display window, an interior electronic display assembly for producing a display at the display window and a scanner package for optically communicating through said scanner window, and wherein said keyboard and display window, and said scanner window are disposed at opposite exterior sides of said enclosure.

6. The scanner of claim 5 further comprising a cable extending from the bottom panel of said enclosure and communicating with said electronic scanner module.

7. The scanner of claim 5 wherein said cushioning material comprises foam panels at side interior surfaces of said enclosure.

8. The scanner of claim 5 wherein said scanner package is mounted to a bracket which is secured to form a shock absorbing mount for the scanner package.

9. A scanner comprising:
   a substantially box-like enclosure comprising a rear panel, an opposite front portion and a bottom panel, said enclosure being manufactured of heavy-duty impact resistant material and an enclosure comprising a reinforcement shroud circumscribing said enclosure adjacent the front thereof;
   an integral handle extending from said second panel, said handle being configured to facilitate manual grasping thereof;
   a scanner window located in said rear panel of said enclosure;
   cushioning material disposed in said enclosure and comprising foam panels disposed on said bottom panel and at side interior surfaces of said enclosure; and
   an electronic scanner module received in said enclosure and engageable against said cushioning material wherein said scanner module is secured in a stable, impact resistant relationship with said enclosure, said electronic scanner module comprising an externally accessible keyboard and display window, an interior electronic display assembly for producing a display at the display window and a scanner package for optically communicating through said scanner window, and wherein said keyboard and display window, and said scanner window are disposed at opposite exterior sides of said enclosure.

10. The scanner of claim 9 further comprising a cable extending from the bottom panel of said enclosure and communicating with said electronic scanner module.

11. The scanner of claim 9 wherein said scanner package is mounted to a bracket which is secured to form a shock absorbing mount for the scanner package.

* * * * *